US005988661A

United States Patent [19]

[11] Patent Number: 5,988,661

[45] Date of Patent: Nov. 23, 1999

Garfinkle

[54] DRIVE ASSISTANCE DEVICE FOR ORDINARY WHEELCHAIRS

[76] Inventor: Moishe Garfinkle, P.O. Box 15855, Philadelphia, Pa. 19103

[21] Appl. No.: 08/807,056

[22] Filed: Feb. 27, 1997

[51] Int. Cl.[6] .................... B62M 1/14

[52] U.S. Cl. .................... 280/250.1; 280/242.1; 280/244

[58] Field of Search .................... 280/242.1, 244, 280/243, 246, 250.1

[56] References Cited

U.S. PATENT DOCUMENTS

| | | | |
|---|---|---|---|
| 3,189,368 | 6/1965 | Petersen | 280/250.1 |
| 3,869,146 | 3/1975 | Bulmer | 280/250.1 |
| 3,877,725 | 4/1975 | Barroza | 280/250.1 |
| 4,354,691 | 10/1982 | Saunders et al. | 280/250.1 |
| 4,358,126 | 11/1982 | Mitchell et al. | 280/250.1 |
| 4,392,690 | 7/1983 | Anderson | 280/250.1 |
| 4,537,415 | 8/1985 | Delahoussaye et al. | 280/250.1 |
| 4,538,826 | 9/1985 | Lemarie | 280/250.1 |
| 5,303,945 | 4/1994 | Oxford | 280/250.1 |

FOREIGN PATENT DOCUMENTS

| | | | |
|---|---|---|---|
| 2703245 | 10/1994 | France | 280/250.1 |
| 3610055 | 10/1987 | Germany | 287/250.1 |
| 2213438 | 8/1989 | United Kingdom | 280/250.1 |
| 9007316 | 7/1990 | WIPO | 280/250.1 |

*Primary Examiner*—Daniel G. DePumpo

[57] ABSTRACT

A drive assistance device is disclosed to assist the occupants of ordinary manual weelchairs to propel themselves. Rather than grasping the grip rings secured to the main wheels of the wheelchair the drive assist provides laterally positioned handles upon which the propulsion force can be comfortably applied. The drive assist device can be simple removed for the wheelchair by the occupant when not required. The device does not require any modification of the ordinary wheelchair. The hub assembly components of the drive assist device are simply bolted to the ordinary wheelchair using the existing fastener arrangement and if necessary can be as easily unbolted and removed.

6 Claims, 10 Drawing Sheets

Figure 5E
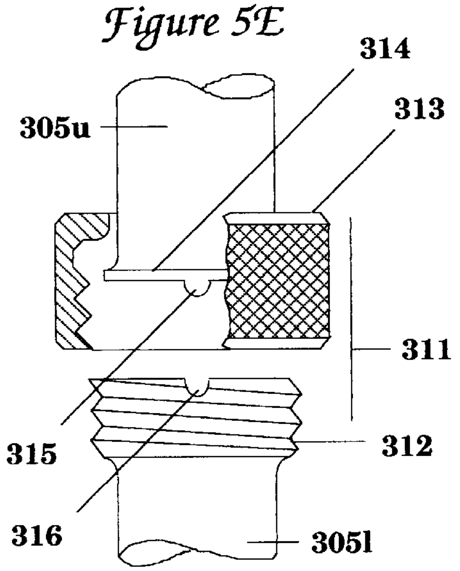
Figure 5F
Figure 5C
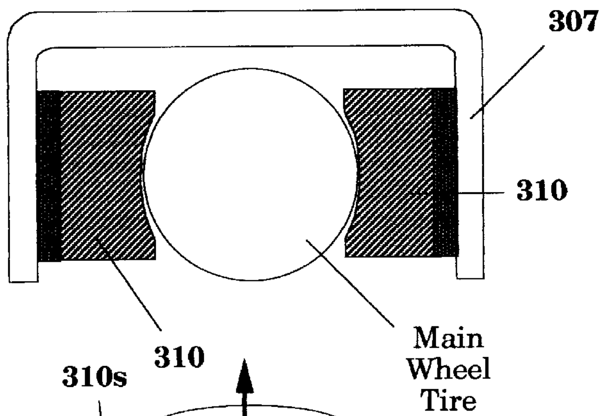
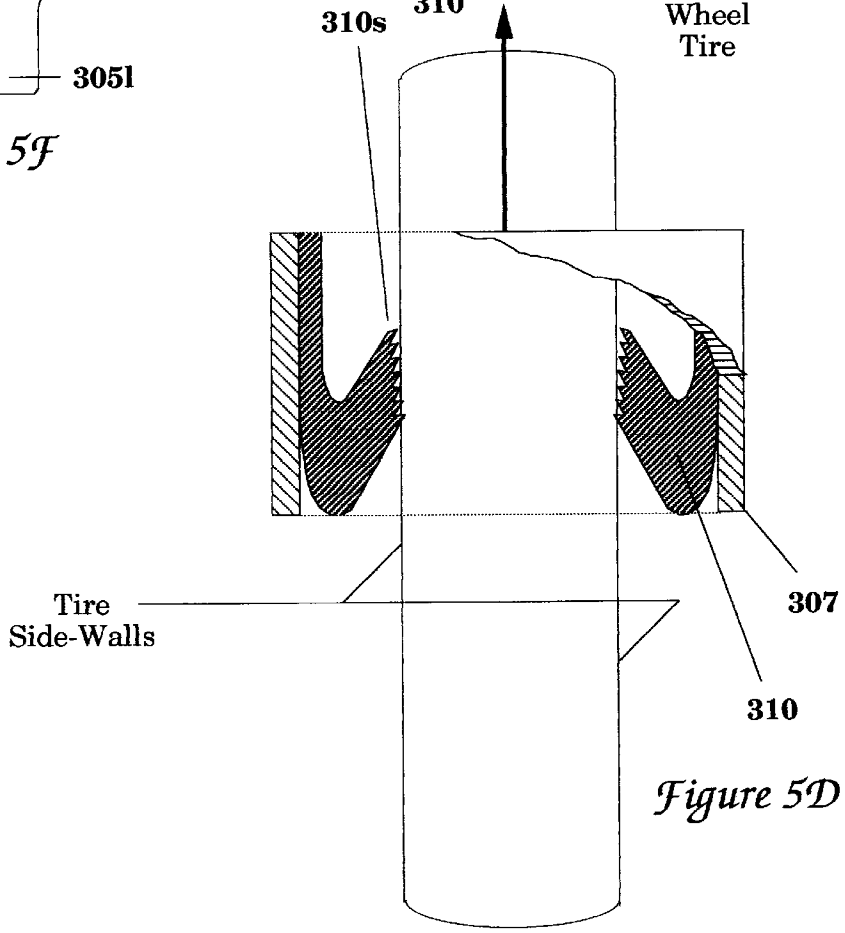
Figure 5D

DRIVE ASSISTANCE DEVICE FOR ORDINARY WHEELCHAIRS

BACKGROUND OF THE INVENTION

Propulsion of ordinary manual wheelchairs is provided by the occupant by means of grip rings secured to the rim of each main wheel. By grasping the grip rings and forcing their rotation the main wheels rotate, propelling the wheelchair. Differential application of force is applied to change the lateral direction of the wheelchair. To grasp the grip ring requires that the forearm be twisted and that the force be applied to the grip by a small portion of the palm between the thumb and the fingers both requirements can be fatiguing, particularly over extended distances inasmuch as appreciable force must be applied to a small gripping area.

OBJECTIVE OF THE INVENTION

When sitting in a normal upright position with hands resting on one's lap, the most comfortable position of the hands is knuckles upwards with the angular rotation of the forearm positioning the hands between flat on the lap at 0° to twisted outwards at 45°, with a 30° twist probably closest to the most comfortable for most people. Hence when gripping two oars during rowing the hands are in close to the most comfortable position for exerting maximum bodily force on the oars with the load applied across the full width of the palms. In contrast to propel a wheelchair the forearms are twisted roughly 90° outwards with the load is applied across only a small portion of the palms.

Figure 1A:
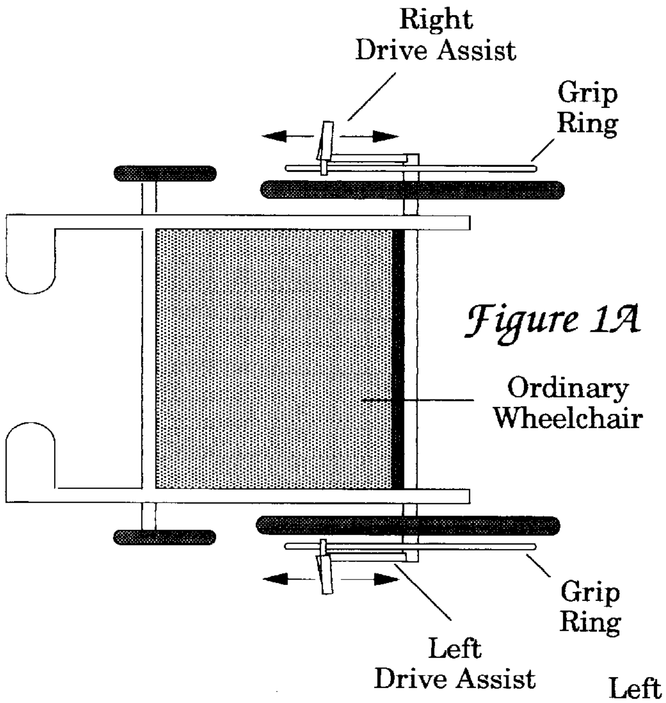
Figure 1B:
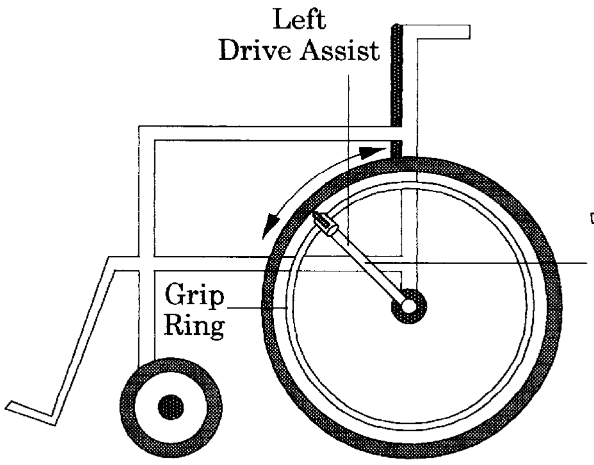
Figure 1C:
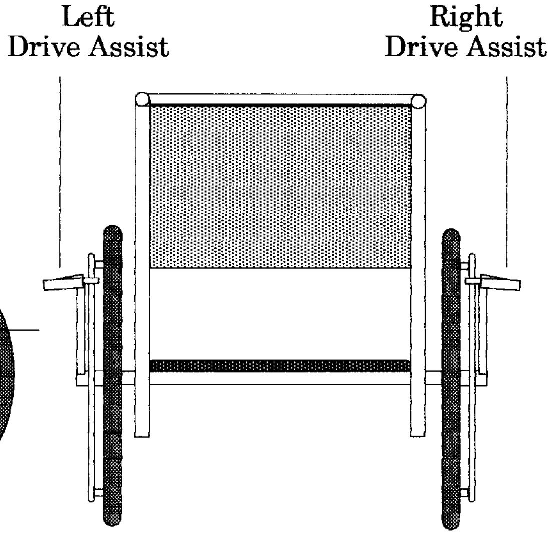

In response to this uncomfortable application of force to propel wheelchairs an invention is disclosed herein denoted the "Wheelchair Drive-Assist" (WCDA) for use with ordinary wheelchairs. FIGS. 1A, 1B and 1C show a WCDA installed on either side of an ordinary wheelchair. The WCDA does not require any modification of the ordinary wheelchair. The components of the WCDA are simply bolted to the wheelchair using the existing fastener arrangement. If required the WCDA components can be as easily unbolted and removed.

The wheelchair occupant pivots the right or left WCDA about the main wheel hubs by applying a circumferential force to the lateral handles of the WCDA.

DRAWINGS

FIG. 1A Top view of ordinary wheelchair with WCDA Installed

FIG. 1B Side view of ordinary wheelchair with WCDA Installed

FIG. 1C Back view of ordinary wheelchair with WCDA Installed

Figure 2A:
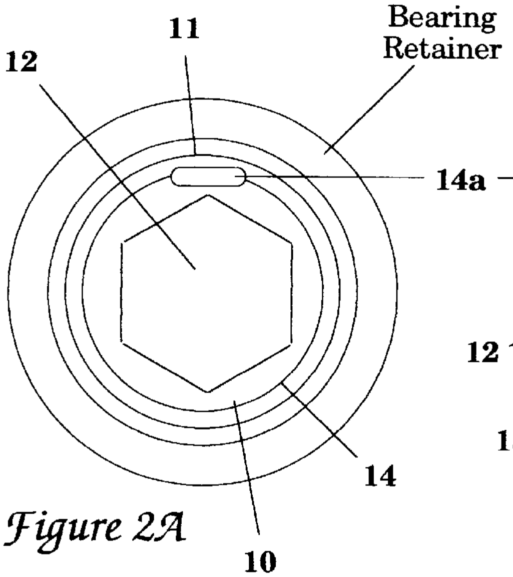

FIG. 2A Front view of hub assembly of WCDA

Figure 2B:
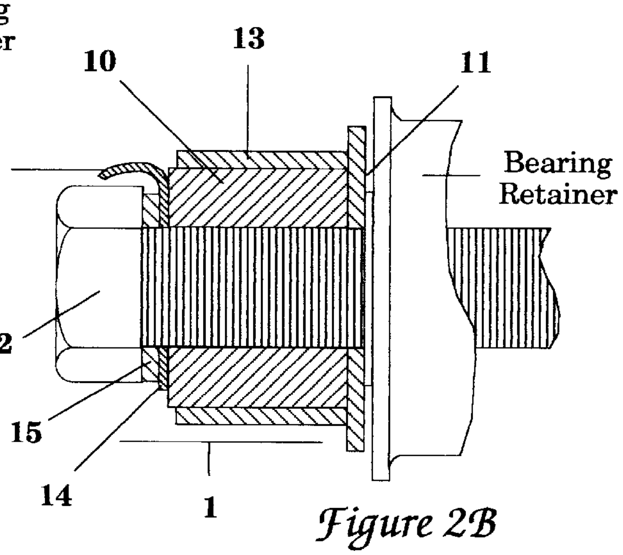

FIG. 2B Side view of hub assembly of WCDA

Figures 3A, 3B, 3C:
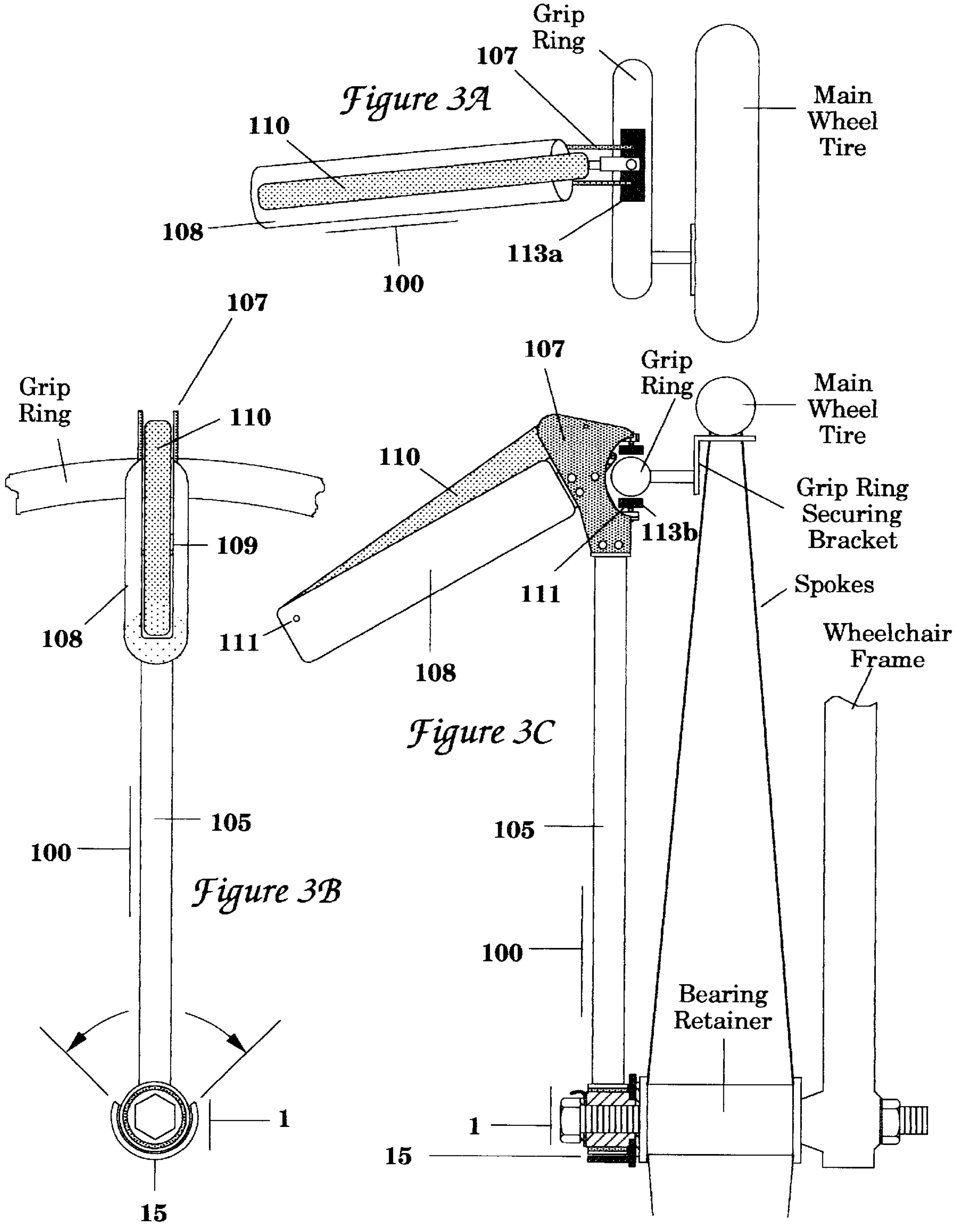

FIG. 3A Top view of essential components of WCDA: 1st embodiment

FIG. 3B Side view of essential components of WCDA: 1st embodiment

FIG. 3C Back view of essential components of WCDA: 1st embodiment

Figure 3D:
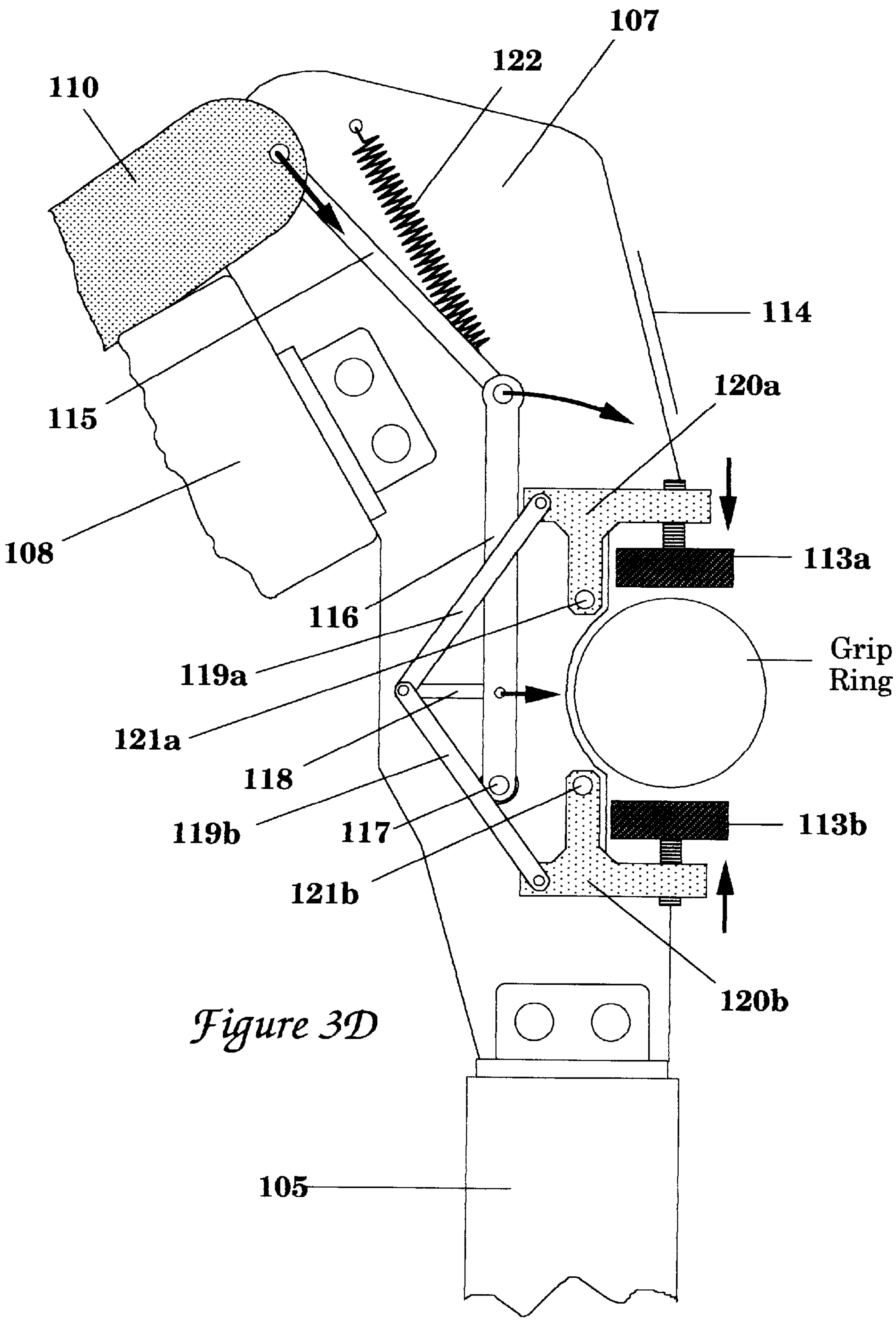

FIG. 3D Linkage arrangement of WCDA: 1st embodiment

Figure 4A:
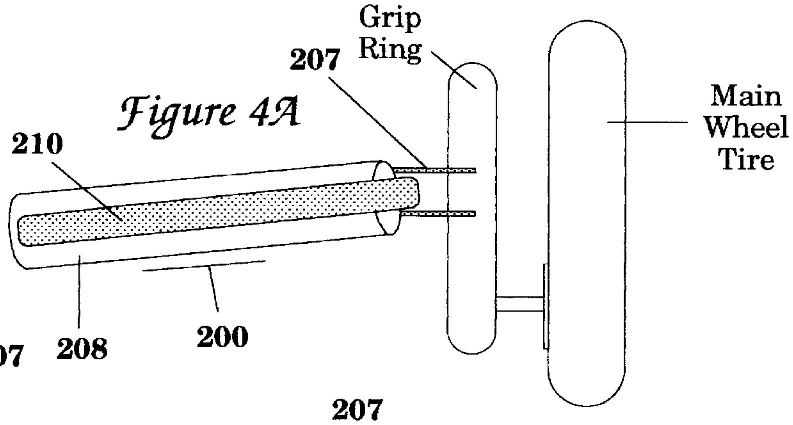

FIG. 4A Top view of essential components of WCDA: 2nd embodiment

Figure 4B:
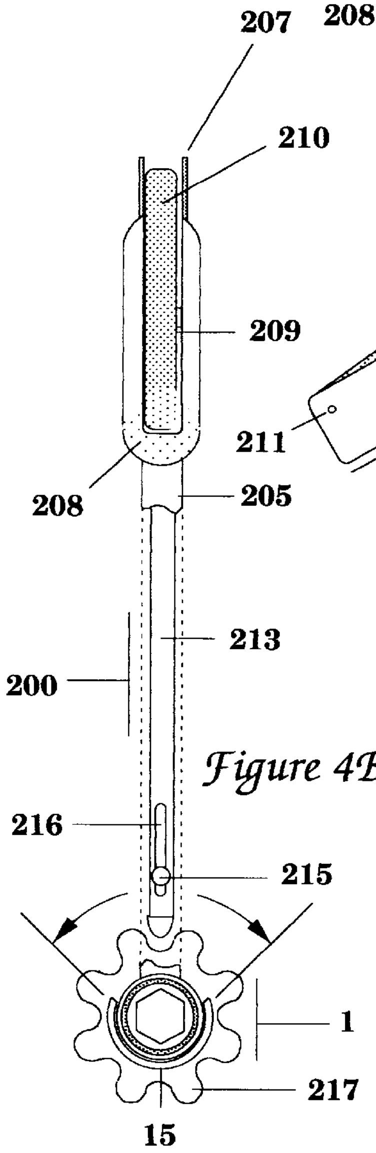

FIG. 4B Side view of essential components of WCDA: 2nd embodiment

Figure 4C:
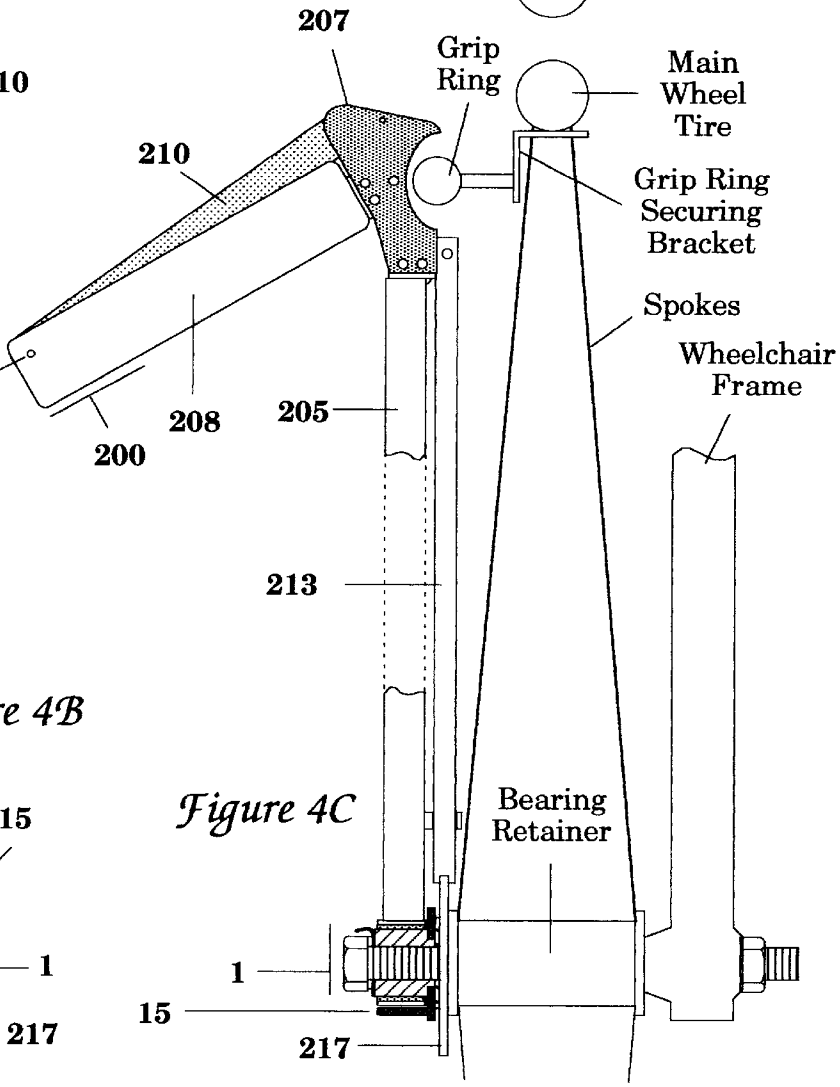

FIG. 4C Back view of essential components of WCDA: 2nd embodiment

Figure 4D:
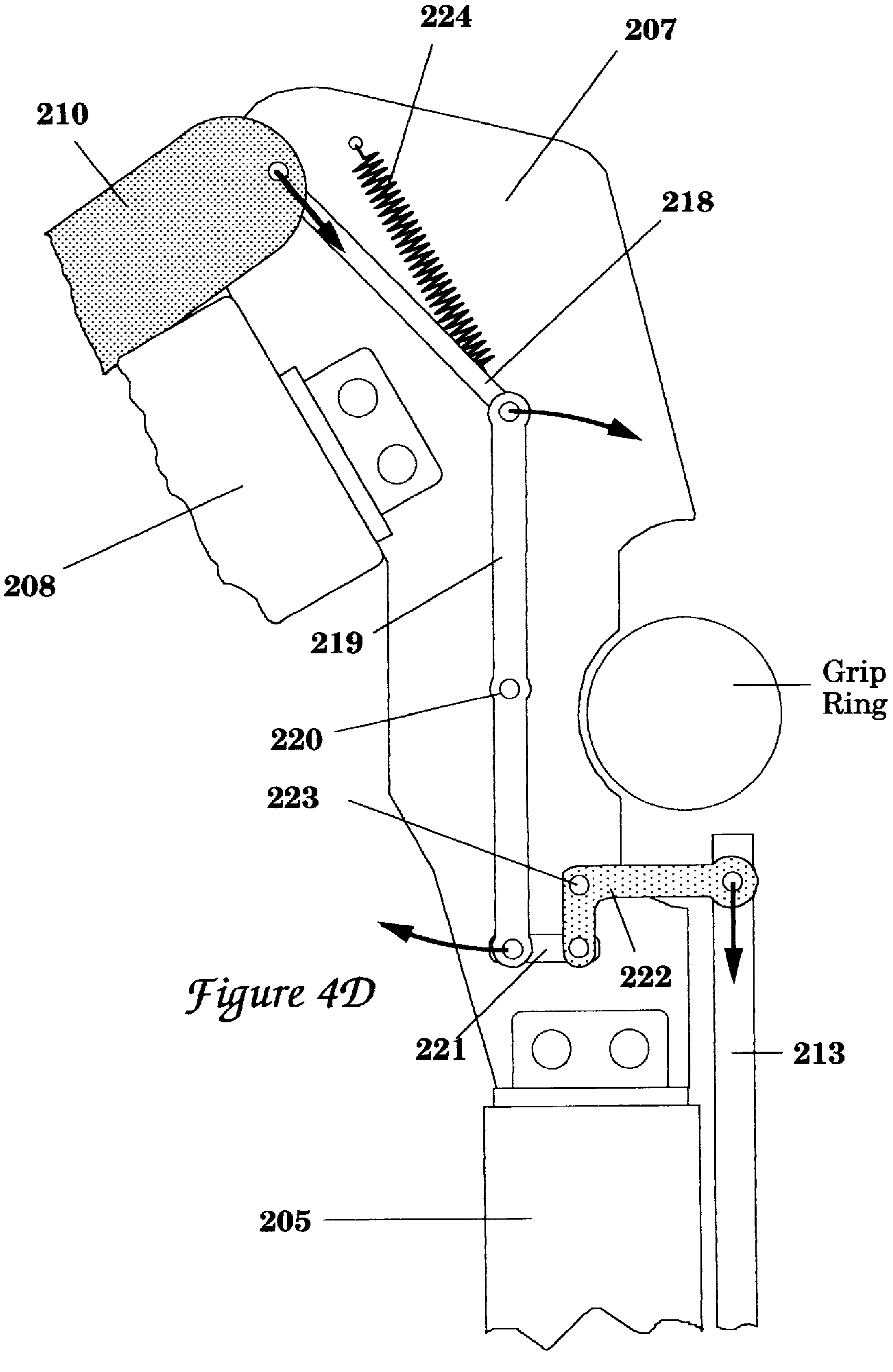

FIG. 4D Linkage arrangement of WCDA: 2nd embodiment

Figure 4F:
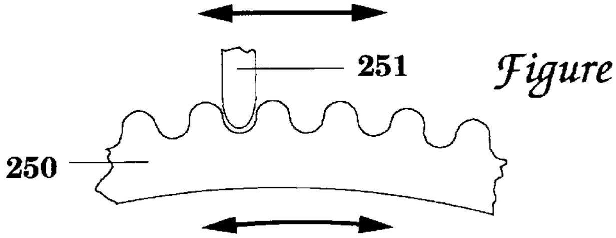
Figure 4E:
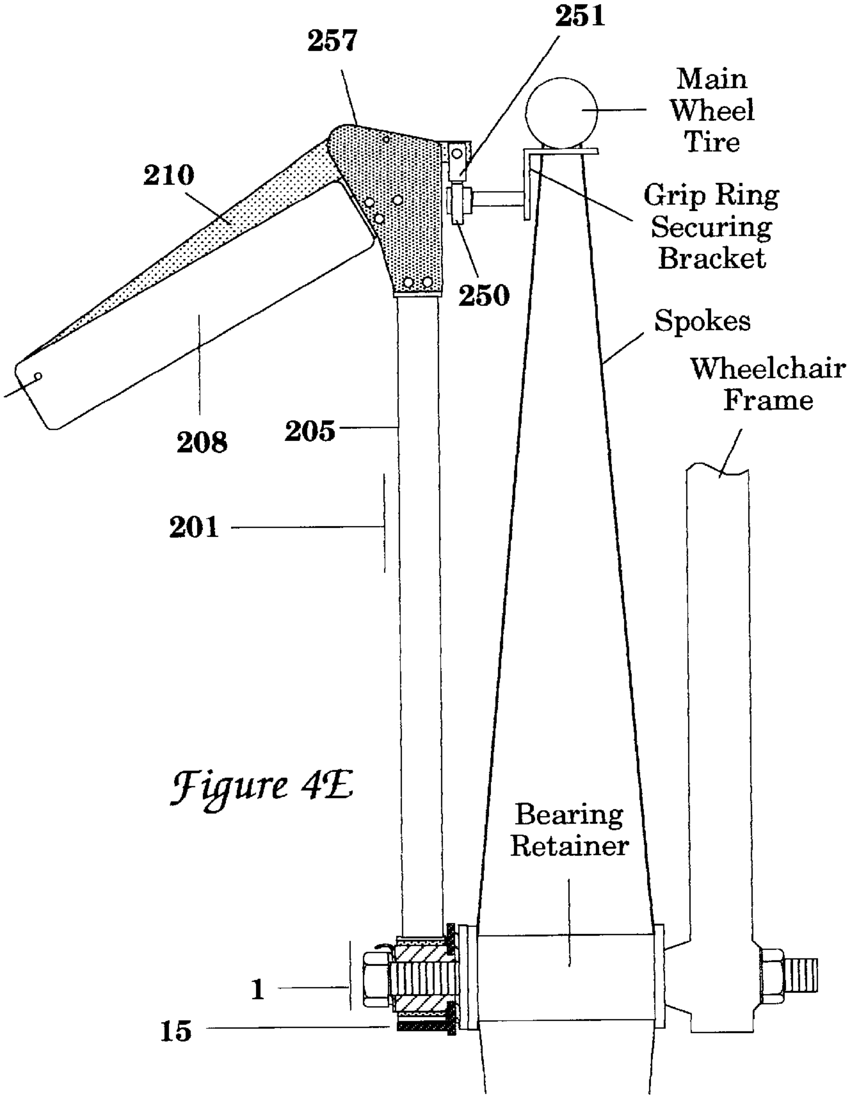
Figures 5A, 5B:
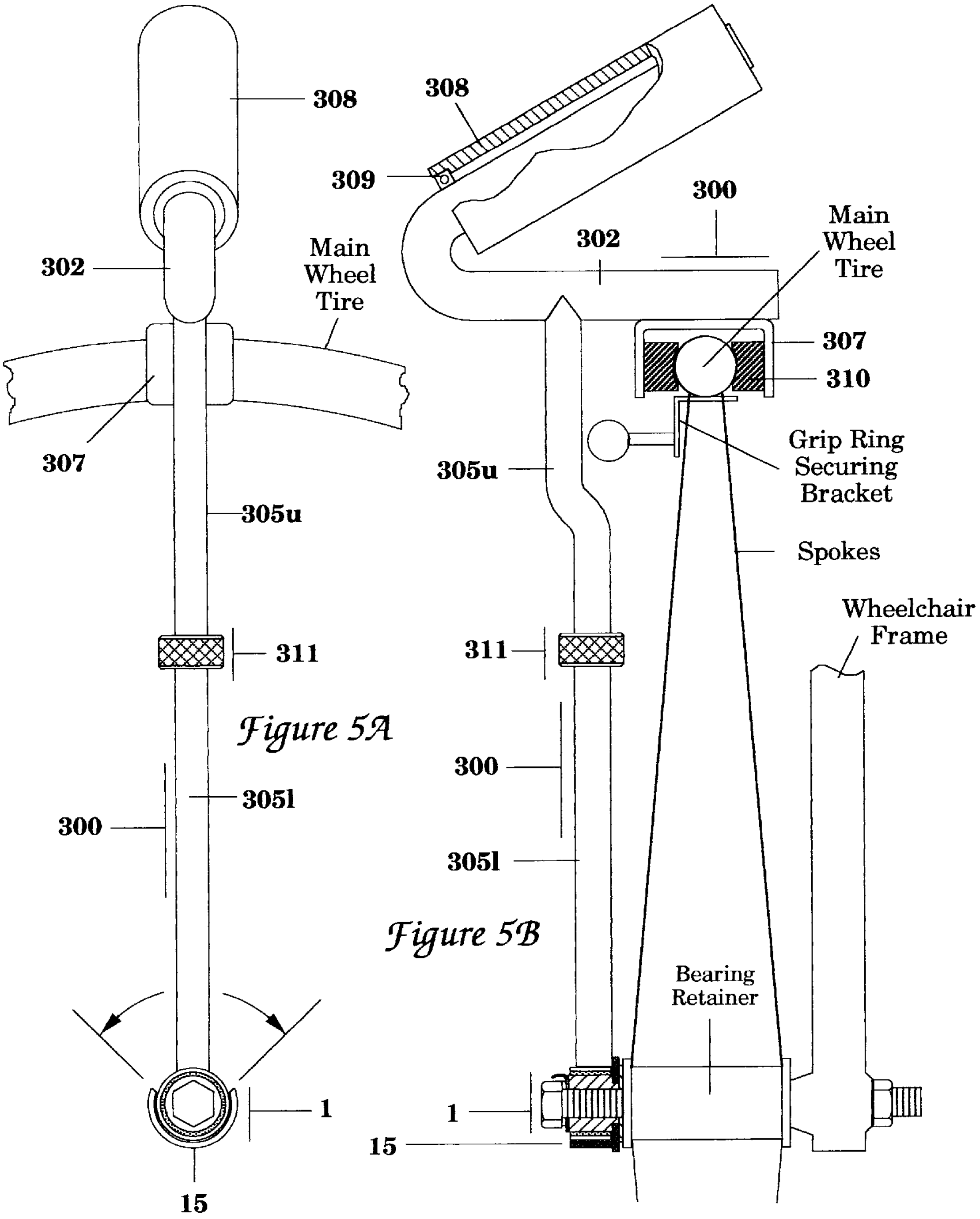
Figure 5H:
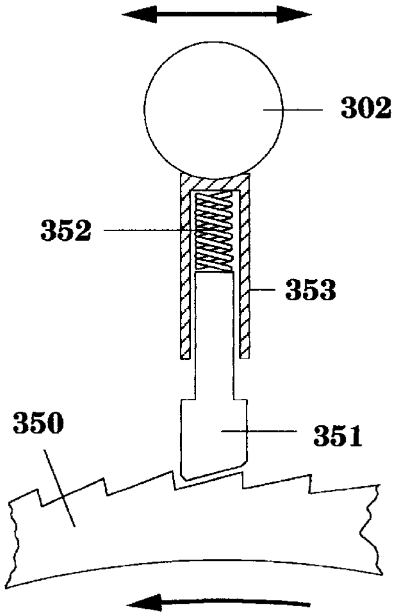
Figure 5G:
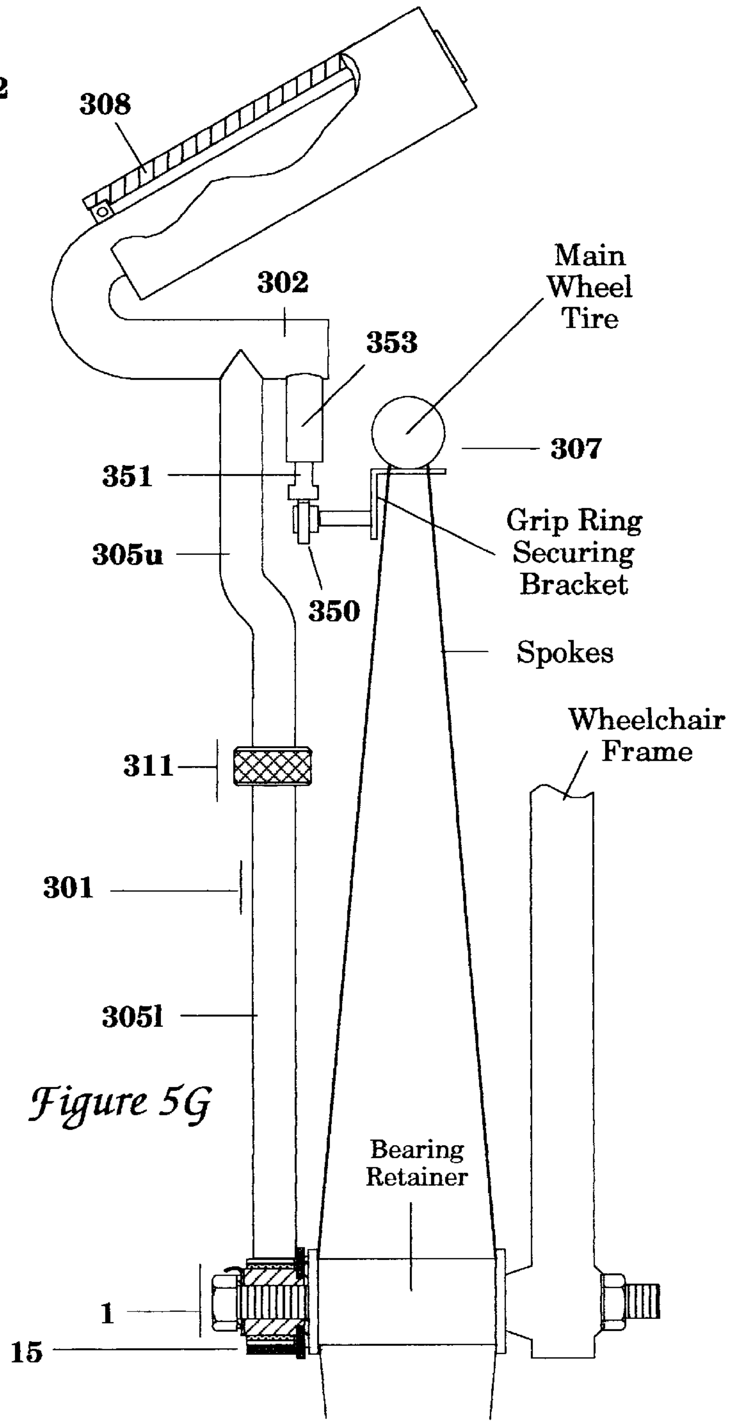

FIG. 4E Back view of essential components of variation on WCDA: 2nd embodiment FIG. 4F Sprocket detail of variation on WCDA: 2nd embodiment FIG. 5A Side view of essential components of WCDA: 3rd embodiment FIG. 5B Front view of essential components of WCDA: 3rd embodiment FIG. 5C Side view of friction pad of WCDA: 3rd embodiment FIG. 5D Side view of friction pad of WCDA: 3rd embodiment FIG. 5E Slip joint detail of WCDA: 3rd embodiment FIG. 5F Slip joint detail of WCDA: 3rd embodiment FIG. 5G Side view of essential components of variation on WCDA: 3rd embodiment FIG. 5H Ratchet detail of variation on WCDA: 3rd embodiment The wheelchair frame, the main wheel bearing-retainer, the main wheel tire, the spokes, the grip ring securing bracket, and the grip ring shown are conventional components of ordinary wheelchairs. Fasteners are not detailed as they are known to those knowledgeable in the art.

REFERENCE

USPTO Disclosure Document 409553, Nov. 29, 1996.

PREFERRED EMBODIMENTS OF THE INVENTION

FIGS. 2A and 2B illustrate the hub assembly 1 of the Wheelchair Drive Assist (WCDA). Assembly 1 is common to all of the embodiments of the WCDA described. The extension shaft 10 is bolted by axle bolt 12 against the face plate 11 in contact with conventional inner race of the bearing retainer. Axle bolt 12 replaces the original shorter axle bolt. The bearing collar 13 slips onto and is in pivotal contact with extension shaft 10. qollar 13 is axially secured to shaft 10 by spring retaining ring 14. Retaining ring 14 is held in rigid contact with shaft 10 by pressure exerted on washer 15 by bolt 12. Tab 14*a* of retaining ring 14 depresses to allow collar 13 to slip on to or off of shaft 10. Hence collar 13 will slip off of shaft 12 only when an axial load is applied to collar 13 to depress tab 14*a*.

FIGS. 3A, 3B and 3C illustrate the first embodiment 100 of the WCDA. Radial column 105 is rigidly secured to support enclosure 107 and to bearing collar 13 of hub assembly 1. Grip handle 108 is rigidly secured to enclosure 107. Handle 108 is slotted 109 to accommodate hand lever 110, permitting the pivoting of level 110 within slot 109 about lever pivot 111. Hence the WCDA 100 can pivot freely about shaft 10. To prevent the WCDA 100 pivoting to the ground when not gripped a simple stop can be mounted between the bearing retainer and shaft 10. Elastomeric stop 16 is shown.

Hand pressure applied by the wheelchair occupant depressing lever 110 forces the friction pads 113 to contact the main wheel drive component comprising the conventional grip ring as shown in FIG. 3D. Hence pivotal movement of handle 108 about shaft 102 with lever 110 depressed forces the grip ring to rotate with WCDA 100 and therefore the main wheel, to which the grip ring is rigidly secured, thereby propelling the wheelchair as occupant desires.

Lever link 115 is pivotally secured to hand lever 110 and pivot beam 116. Hence depressing hand lever 110 causes pivot beam 116 to pivot in the angular direction shown about pivot axis 117 fixed to enclosure 107. Accordingly actuator link 118 is displaced laterally in the direction shown. This displacement moves the displacement links 119*a* and 119*b* so as to pivot pad beams 120*a* and 120*b* in the direction show about pivot axes 121*a* and 121*b* fixed to the enclosure 107. So pivoting pad beams 120*a* and 120*b* moves friction pads 113*a* and 113*b*, secured to pad beams 120*a* and 120*b* respectively, into friction contact with the grip ring. When pressure is released from hand lever 110 tension spring 122 pulls lever link 115 back to its original position, releasing the grip of friction pads 113*a* and 113*b* on the grip ring.

FIGS. 4A, 4B and 4C illustrate the second embodiment 200 of the WCDA. Radial column 205 is rigidly secured to support enclosure 207 and to bearing collar 13 of hub assembly 1. Grip handle 208 is rigidly secured to enclosure 207. Handle 20 is slotted 209 to accommodate hand lever 210, permitting the pivoting of lever 210 within slot 209 about lever pivot 211. Hence the WCDA 200 can pivot freely about shaft 10. To prevent the WCDA 200 pivoting to the ground when not gripped a simple stop can be mounted between the bearing retainer and shaft 10. Elastomeric stop 15 is shown.

Hand pressure depressing hand lever 210 forces the sprocket control rod 213 to descend within enclosure 207. Sprocket control rod 213 is guided by pin 215, secured to column 205, in slideable contact with slot 216 in rod 213. Sprocket column rod 213 engages the main wheel drive component comprising hub sprocket 217 secured to, and axially aligned with, the bearing retainer of the main wheel. Hence pivotal movement of handle 208 about shaft 10 with hand lever 210 depressed causes the sprocket 218 to rotate with WCDA 200 and therefore the main wheel, to which sprocket 217 is rigidly secured, thereby propelling the wheelchair as occupant desires.

Lever link 218 is pivotally secured to hand lever 210 and pivot beam 219 as shown in FIG. 4D. Hence depressing hand lever 210 causes pivot beam 219 to pivot about pivot axis 220 in the angular direction shown. Accordingly actuator link 221 is displaced laterally in the direction shown. This displacement pivots actuator beam 222 about pivot axes 223, moving sprocket control rod 213 in the direction shown to engage sprocket 217. When pressure is released from level 210 tension spring 224 pulls lever link 218 back to its original poisition, disengaging rod 213 from sprocket 217.

FIGS. 4E and 4F illustrate a modification 201 of the second embodiment 200 of the WCDA wherein a main wheel drive component comprising a sprocket ring 250 is substituted for the grip ring and is secured to the grip-ring securing bracket. Sprocket control rod 251 engages sprocket 250, actuated by essentially the same linkage arrangement as utilized by WCDA 200. Hence pivotal movement of handle 208 about shaft 10 with lever 210 depressed causes the sprocket 250 to rotate with drive assist 201 and therefore the main wheel, to which sprocket 250 is rigidly secured, thereby propelling the wheelchair as occupant desires.

FIGS. 5A and 5B illustrate the third embodiment 300 of the WCDA, with the WCDA designed for the high torque operation that might be encountered during competitive events such as racing. Drive frame 302 is rigidly secured to friction pad enclosure 3D7 and upper column 305u. Lower column 305l is rigidly secured to bearing collar 13 of hub assembly 1. Grip handle 308 is rotatably secured to drive frame 3C2 by means of bearings 309. The handle 308 is free to rotate on bearings 309 so that the direction the force is imposed on handle 308 of WCDA 300 by the wheelchair occupant is not affected by the orientation of the wrist of the wheelchair occupant. To prevent the WCDA 300 pivoting to the ground when not gripped a simple stop can be mounted between the bearing retainer and shaft 10. Elastomeric stop 15 is shown.

The laterally positioned friction pads 310 are secured within the enclosure 307 and directly contact the main wheel drive component comprising the sidewalls of the main wheel tire as shown in FIGS. 5C and 5D. When the enclosure 307 is shoved forward in the direction shown the serrated ends 310s of the pads 310 grip the tire sidewalls. As the imposed force on the enclosure 307 by the wheelchair occupant is increased the grip of the pads 310 increases as the pad 310 jams against the tire sidewall. When the WCDA 300 is shoved backward however the pads simply slip along the tire sidewalls. Hence WCDA 300 is designed for essentially forward motion and maneuvering as might be required for competitive events.

Because the friction pads 310 are lateral positioned their removal requires that they be vertically lifted away from the tire before the bearing collar 13 can be axially removed from hub assembly 1. This orthogonal motion is accommodated by the column joint 311, shown in FIGS. 5E and 5F, which rigidly joins upper radial column 305u to lower radial column 305l. The upper end of lower column 305l is secured to threaded section 312. Retaining collar 313 is slideably secured to upper column 305u and retained by lip 314. When lip 314 is lowered into contact with threaded section 312 extension 315 fits into recess 316, precluding rotation of upper column 305u with respect to lower column 305l. Threading retaining collar 313 onto threaded section 312 locks upper column 305u and lower column 305l into a single rigid unit.

FIGS. 5G and 5H illustrate a modification 301 of the third embodiment 300 of the WCDA wherein the main wheel drive component comprising a ratchet ring 350 is substituted for the grip ring and is secured to the grip-ring securing bracket. When grip handle 308 is shoved forward ratchet rod 351 guided by spring housing 353 engages ratchet ring 350, pushing ring 350 only in the direction shown. In the opposite direction rod 351 rides over ratchet ring 350, compressing spring 352 within spring housing 353, with housing 353 rigidly secured to drive frame 302.

While there have been described what is at present considered to be the preferred embodiments of the Drive Assistance Device for Ordinary Wheelchairs, it will be obvious to those skilled in the art that various changes and modifications may be made therein without departing from the invention, and it is the objective therefore in the appended claims to cover all such changes and modifications as fall-within the true spirit and scope of the invention.

What is claimed is:

1. A drive assistance device for an wheelchair wherein the a grip handle of said device is grasped by the occupant of said wheelchair and used to propel said wheelchair by pivotal motion of said device about an axis of a main wheel of said wheelchair, said drive assistance device comprising a main wheel hub assembly adapted to be secured to the hub of said main wheel of said wheelchair, a radial column rigidly secured at one end to a collar and rigidly secured at the other end to an enclosure;

a grip handle secured to said enclosure and angled as to minimize twisting of wrists of said occupant on grasping of said handle, a hand lever pivotally secured to said handle and to a mechanical linkage;

friction pads adapted to be positioned in proximity of the grip-ring of said main wheel, said pads pivotally secured to said mechanical linkage;

whereupon actuation of said hand lever causes said friction pads to grip said grip-ring through said mechanical linkage, wherein pivotal motion of said handle by said occupant of said wheelchair about said hub assembly causes said grip-ring to rotate, thereby rotating said main wheel secured to said grip-ring, with said occupant contacting neither said main wheel or said grip-ring, nor requiring twisting of occupant's wrist.

2. A drive assistance device according to claim 1, wherein said hub assembly comprises a retaining ring having a spring tab bolted against an extension shaft with a radial extent of the spring tab of said retaining ring greater than a radius of said extension shaft, said extension shaft adapted to be secured against the bearing retainer of said main wheel; said collar pivotally secured to said extension shaft;

whereupon said collar can be slipped axially on to or off of said extension shaft only upon depression of said spring tab on said retaining ring by said collar.

3. A drive assistance device according to claim 2 wherein said hand lever is pivotally secured to said handle; whereupon depression of said lever moves said friction pads through said mechanical linkage into contact with said grip-ring component secured to said main wheel, said handle and said linkage arrangement secured to said support enclosure, said enclosure secured to said collar by said rigid radial column, whereby pivoting said enclosure about said collar pivotally secured to said extension shaft with said lever depressed thereby pivots said main wheel, propelling said wheelchair as said occupant desires.

4. A drive assistance device according to claim 3 wherein said mechanical linkage comprises a lever linkage pivotally secured to said hand lever and to a pivot beam, said pivot beam pivotally secured to an actuator link, said actuator link pivotally secured to two displacement links, said displacement-links pivotally secured each to the two pad beams to which the friction pads are secured, whereupon depressing said hand lever pivots said pad beams, bringing said fraction pads into contact with said grip-ring.

5. A drive assistance device according to claim 4 wherein said handle is slotted to accommodate said hand lever, said hand lever pivotally secured to said handle at extreme end of said handle, whereupon depressing said hand lever pivots said pad beams, bringing said fraction pads into contact with said grip-ring.

6. A drive assistance device according to claim 5 wherein said hand lever pivotally secured to said handle at extreme end of said handle, whereupon actuation of said hand lever is effected by palm at relatively stronger inside edge of hand rather than relatively weaker outside edge of hand.

* * * * *